Figure 1:
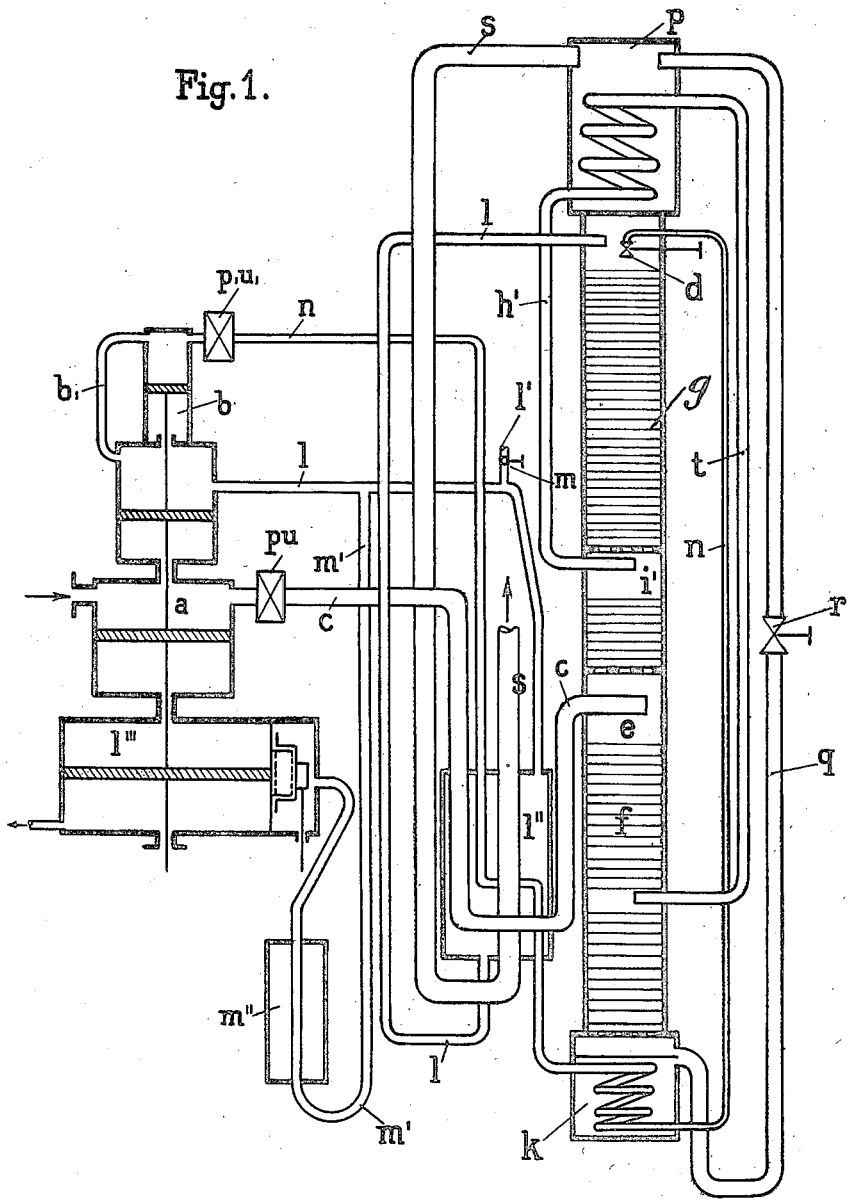

Patented Dec. 30, 1924.

1,521,115

UNITED STATES PATENT OFFICE.

RUDOLF FERDINAND MEWES AND RUDOLF KARL EDUARD MEWES, OF BERLIN, GERMANY.

PROCESS FOR SEPARATING GAS MIXTURES UNDER PRESSURE.

Application filed August 20, 1923. Serial No. 658,460.

*To all whom it may concern:*

Be it known that we, RUDOLF FERDINAND MEWES and RUDOLF KARL EDUARD MEWES, residing at Berlin, Germany, have invented certain new and useful Improvements in a Process for Separating Gas Mixtures Under Pressure, of which the following is a specification.

This invention relates to a novel process for separating gas mixtures under pressure in a circulating system traversed by components with different boiling points.

In order to enable a considerable amount of useful mechanical effect to be recovered in the course of the process of separation under any desired pressure, the process according to the invention is carried out in such a way that the commercially pure nitrogen obtained in the separator rectifying column is conducted under the pressure of the separator through a heat exchanger and thus first reheated almost up to the temperature of its neighbourhood and then caused to perform work in an expansion machine; or machines such as rock drills, rock mills, power hammers, machine tools etc. of a piston or rotatory pipe. When the gas is expanded the exhaust temperature of the expansion machine will sink, when a pressure of 6-7 atmosphere super-pressure is employed, to considerably beneath 0°, say to 60 to 70° centigrade below zero. In addition to the mechanical work an appreciable amount of cold is thus obtained which, like the mechanical work, can be usefully employed for divers purposes or can also be turned to account in the separating process itself.

The nitrogen that issues from the heat exchanger may be heated, before it is expanded far above its exhaust temperature by admitting heat into the process of heating by mixing or by surface heating. This heating may also be conveniently accomplished by means of the heat of compression of the air to be separated and of the compressed nitrogen. For heating the higher temperatures up to 300° C. and more, however, special heating devices are used which are heated by hot waste products of higher temperature or by fire gases. This method of carrying out the novel process offers the advantage that almost the entire work of compression can be recovered for the separation process and thus a considerable saving of mechanical work of compression (steam power, electric current, work from a driving shaft) can be effected because air superheated in this manner is capable of performing a greater amount of mechanical work.

The novel process offers the extraordinary advantage that it is not only capable of supplying the compressed oxygen properly mixed with air, required for the known nitrogen combustion furnaces operated by means of the electric arc, but that the nitrose gases that issue from the combustion furnace and have to be quenched or suddenly cooled are capable of heating the compressed nitrogen to higher temperatures than 300 to 400° C. in special wind heaters on account of their high temperatures. The present process therefore offers the advantage that it enables oxygen and nitrogen to be obtained as a by-product and therefore cheaply. This is important for enriching the wind of blast furnaces, Siemens-Martin furnaces, lime, porcelain, generator gas, and water gas furnaces, because in these the waste heat suffices to produce in this way such large quantities of commercial oxygen as enable operations to be carried on economically even with poor quality coal, i. e. for example brown coal, peat or the like, instead of black coal, coke or anthracite.

To enable the process to be started a container for compressed air or nitrogen is inserted in one of the pressure pipes, preferably before the place where expansion or superheating or heating takes place, and the cubical contents of this container is such that the process may be started and the used pressure medium nitrogen may be automatically replaced similarly as in a Diesel engine. By this means the advantage is gained that the plant is always ready for service.

The invention is illustrated in the drawing in which—

Figure 2:
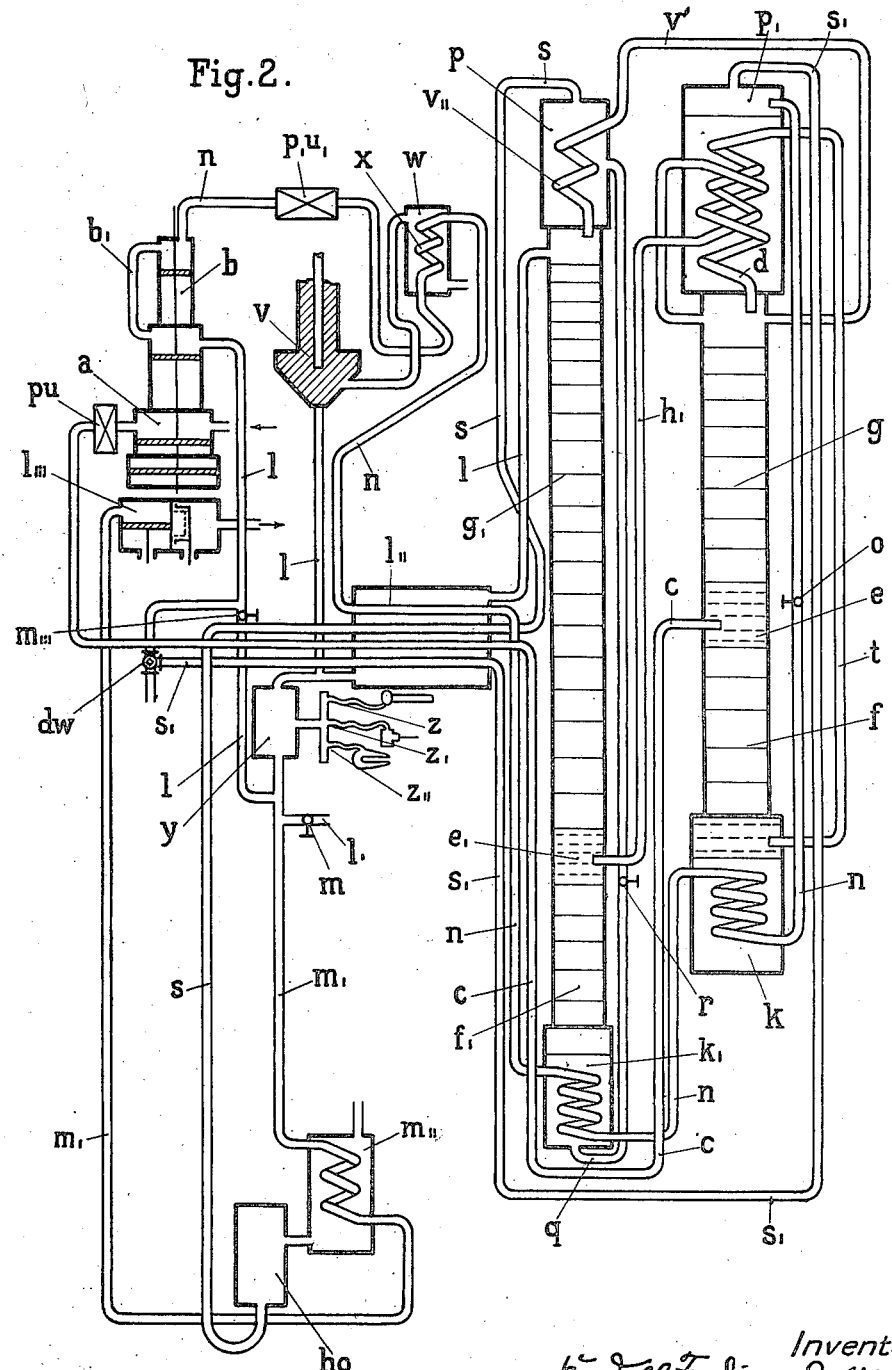

Figs. 1 and 2 are diagrammatic representations of installation for separating air into its chief components, in which special heating appliances are used for heating the nitrogen that issues at a low pressure from the top of the rectifying column, Fig. 2 differing from Fig. 1 in that rectifying column is divided into 2 parts placed beside each other.

The operations in the process represented in Fig. 1 are as follows: The low pressure compressor *a* which may be of the single stage or two stage type, draws in purified air, compresses it up to the pressure (about two to ten atmospheres) which obtains in a rectifying column, and—after it has been purified to the greatest possible extent in a purifier *pu*, and then merely precooled—drives it through a heat exchanger *l''* by way of the pipe *c* where it may be partly or entirely liquefied. The air then passes into the middle or lower part of the chamber *e*, whence the liquid flows through the evaporating column *f* down to the oxygen separator *k*. During its descent in the column *f* the liquid is freed of nitrogen by the ascending oxygen vapors. The vapors rise from *e* through the dephlegmation column *g* and are freed of their oxygen by descending liquid nitrogen. From the top of the column pure nitrogen vapors pass into the pipe *l*, traverse the heat exchanger *l''* of the plant the size of which is such that it is capable of acting as a pressure equalizer and then proceed partly into the multistage high pressure nitrogen compressor *b* provided with the intermediate pipe *b'* and thence, after being purified and precooled, through a pipe *n* and through the heat exchanger *l''* into the evaporator *k*, where they evaporate the liquid oxygen required for the rectifying process in the column. The excess liquid oxygen passes into a pipe *q* and, after it is expanded by means of a throttled valve *r*, enters the condenser *p*, where it will be heated by the pipe *t* branched off from the rectifying column *g*, *f*. The said oxygen evaporates in the condenser *p* and the liquid which is formed in the heating pipe *t* and which is rich in oxygen flows back together with the vapors from the pipe *t* through the pipe *h'* back into the rectifying column at *i'*. The nitrogen from the pipe *n*, after passing through the evaporator *k* is expanded through the throttle valve *d* and reduced to the pressure existing at the topmost part of the dephlegmation column *g*. The descending nitrogen serves to separate or wash the ascending vapors.

The other part of the nitrogen vapors tapped off from the pipe *l* passes into the branch pipe *m'* and traverses a nitrogen heater *m''* where it may be heated up to any desired degree whence it passes into an expansion machine *l'''* performing useful work.

In the modification shown in Fig. 2 the rectifying column is divided into two columns *g*, *f* and *g'*, *f'* in both of which the same pressure exists and which are connected to each other by connecting pipes. This figure also illustrates the method of distributing nitrogen to work machines such as rock drills, rock mills, machine tools, power hammers, riveting machines etc. of a piston or rotatory type, the compressed nitrogen for operating these machines being conducted through branch pipes leading from the conduit by which the nitrogen is conducted out of the rectifying column. The nitrogen thus employed for operating work machines is preferably tapped off after it has passed through a container or pressure equalizer *y* arranged behind the heat exchanger. This type of nitrogen distributing system is particularly important for mines, because, by employing it, an air compressor plant for operating work machines etc., which, at present are driven by compressed air, can be dispensed with. Hence a plant of the kind shown in Fig. 2 e. g. when installed on a mine, will produce compressed nitrogen for operating the said work machines and will also generate oxygen as a by-product. The operations in this modified process are as follows:

A two or three stage compressor *b* provided with an intermediate pipe *b'* draws in through the pipe *l* a part of the nitrogen which issues from the rectifying column at the pressure existing therein. This nitrogen is compressed by the compressor *b* to a high pressure and then driven through the heat exchanger *l''* and thereupon through the oxygen evaporator *k'*, and through the liquid evaporator *k*. The liquid nitrogen obtained is expanded through a throttle valve *o* and conducted at any desired pressure, which may be as low as that of the atmosphere, into the condenser *p'*. If a suction pump is connected to the pipe *s'* the pressure of the nitrogen entering the condenser may be made even lower than that of the atmosphere. Liquid nitrogen accumulates in the condenser *p'*, while the nitrogen vapor passes through the heat exchanger *l''* to the place where it is used. The evaporating nitrogen liquid, by means of its surface cooling effect on the cooling coil *d*, liquefies the vapors ascending from the top part of the dephlegmation column *g*. The liquid nitrogen thus formed descends in the dephlegmation column and serves to separate the oxygen from the ascending vapors.

As in the case of Fig. 1 gaseous air, or air which is more or less precooled or even saturated or partially or entirely liquefied in the lower or middle part of the rectifying column *f*, *g* is introduced at *e*. This introduction of air is here again performed by low pressure compressor *a* which draws in purified air and compresses it until its pressure equals that which obtains in the rectifying column. The air which is thus compressed is purified to the greatest possible extent and driven by the low pressure compressor *a* through the heat exchanger *l''* into the rectifying column at *e*. The ascending nitrogen vapors, after being freed from oxygen, pass into the connecting pipe $v'$ which conducts them into the condenser coil $v''$ in the upper part of the second column $g'$. The liquid nitrogen formed in $v''$ flows downward, while the nitrogen vapors formed in $g'$, after passing through the heat exchanger $l''$ as in a case of Fig. 1, are conducted by the pipe $l$ to the high pressure nitrogen compressor $b$ provided with an intermediate pipe $b'$. A part of the nitrogen vapors is branched off from the pipe $l$ and conducted through a superheater $m''$ and then to an expanding machine $l'''$. The condenser coil $v''$ is located in a condenser $p$ which, through a pipe $q$ provided with a valve $r$, receives liquid oxygen from the oxygen evaporator $k'$. The liquid oxygen, which is expanded until its pressure is almost equal to that of the atmosphere, imparts its heat of evaporation to the condenser coil $v''$ and thus gives off its temperature to the nitrogen subjected to the pressure obtaining in the rectifying column so as to liquefy the same. The oxygen itself escapes in a gaseous form through the pipe $s$ and after passing through the heat exchanger $l''$, is conducted to the place where it is used. The nitrogen which passes from the upper end of the rectifying column $g'$ through the heat exchanger $l''$ may be conducted into a pressure equalizer $y$ and then led through branch pipes $z$, $z'$, $z''$. The pipe $z$ may supply compressed nitrogen to a rock drill for example. The pipes $z''$ and $z'$ are illustrated as supplying compressed nitrogen to a riveting machine and a compressed air hammer respectively. Thus these work machines, instead of being operated by compressed air, are operated by compressed nitrogen. The vapor which is obtained in the evaporator $k$, and which is rich in oxygen, passes into the pipe $t$ by which it is conducted into a coil located in the condenser $p'$. The liquid formed in the condensor coil, and the vapors in the same, pass through a pipe $h'$ into the lower part $e'$ of the rectifying column $g'$, $f'$ where they are rectified in the known manner. In the modification shown in Fig. 2 the nitrogen required for the process of circulation, instead of being taken from the pipe or heat exchanger $l''$ at the pressure obtaining in the rectifying column as in a case of Fig. 1 is drawn from the pipe $s'$ at any desired pressure by a three stage compressor, or a compressor with a larger number of stages, and raised to a high pressure. By this means it is possible to convert existing plants arranged in accordance with old systems into modern plants utilizing the process according to this invention.

The division of the rectifying column represented in Fig. 2 can also be carried out in a plant arranged according to Fig. 1 in which the cooling at the top of the dephlegmation column $g$ is obtained by injecting liquid nitrogen from pipe $n$ through valve $o$ into the column and thus mixing liquid nitrogen with the ascending nitrogen vapors. In order to be able to operate in both processes with a pressure which always remains uniform but may be varied at will the low pressure compressor which takes in the new air supplied to the system may be provided with an automatic pressure regulating device in a known manner. This renders it possible to regulate at will the quantities of gas or vapors that pass through the rectifying column by altering the output of the nitrogen expansion machine without having to alter the pressure in the rectifying column. This is of great importance when the plant is kept working continuously and greatly facilitates the control of the process as compared with previously proposed methods of operation.

In utilizing the aforementioned process for increasing the contents of oxygen in the wind of blast furnaces the additional oxygen required for producing an increase of temperature (up to about 1600 to 1800° C.) is obtained by means of the waste gases of the gases of combustion produced in the blast furnace these waste gases having a corresponding high temperature. The additional oxygen required for increasing the oxygen contents of the blast furnace wind is obtained as a by-product which entails hardly any additional costs. The waste gases of the blast furnace $ho$ (Fig. 2), whose temperature has been raised by an addition of oxygen to about 1800° C., are conducted through the super-heater $m''$ (Fig. 2). The heat of these waste gases enables so much mechanical power to be gained in the expansion machine $l'''$ that the oxygen required for operating the blast furnace may be obtained as a by-product with entailing hardly any additional costs.

This advantage is particularly important in cases in which high temperature furnaces are operated by means of generator gas or continually produced water gas. In both cases the gaseous fuel and also the solid fuel can be supplied with air for combustion that has been enriched with oxygen. A water gas furnace may be advantageously run continuously on a part of the produced water gas with an addition of oxygen and steam.

What we claim is:

1. Process for liquefying and separating oxygen and nitrogen gases by means of a rectifying column provided with a dephlegmation column, and evaporating column, an evaporator beneath the evaporating column and a condenser above the dephlegmation column said process consisting in compressing the gases up to any desired pressure, conducting them in a gaseous state through a heat exchanger into the dephlegmation column connected to the evaporating column of the rectifying column; allowing them to ascend in the column and exchange their oxygen for descending nitrogen so that the oxygen descends in a liquid state while the nitrogen vapors ascend and a part of the nitrogen vapors is liquefied by the condenser at the top of the rectifying column and conducted back into the top of the rectifying column; while another part of the said nitrogen vapors is conducted from the top of the evaporating column through the condenser of the dephlegmation column, liquefied in the same and caused to flow in a liquid state into the top of the dephlegmation column; conducting the nitrogen vapors that ascend from the dephlegmation column to the exterior of this column and through a heat exchanger; tapping off a part of the last named nitrogen vapors from the heat exchanger at a point beyond the coldest point in the circulation system and then expanding the said tapped off vapors under performance of useful work; compressing up to a considerable pressure the part of nitrogen vapors that is not tapped off and conducting them first through a heat exchanger, then through the evaporator or the dephlegmation column for the purpose of heating it, then through the evaporator of the evaporating column for the purpose of heating it then through an expanding device by which it is caused to expand to a sufficiently low pressure and into a condenser above the evaporating column, while the vapors formed in the evaporator of the evaporating column are conducted by a cooling pipe through a condenser located above the evaporating column and the liquid thus formed is allowed to flow into the dephlegmation column; allowing the liquid oxygen which collects in the evaporator of the dephlegmation column to pass into the condenser situated above the dephlegmation column and allowing it to expand in the said condenser so that its pressure drops from the pressure existing in the rectifying column to almost atmospheric pressure, and in conducting the vapors formed in the said condenser to the place where they are required.

2. Process for liquefying and separating oxygen and nitrogen gases by means of a rectifying column provided with a dephlegmation column, an evaporating column, an evaporator beneath the evaporating column and a condenser above the dephlegmation column said process consisting in compressing the gases up to any desired pressure, conducting them in a gaseous state through a heat exchanger into the dephlegmation column connected to the evaporating column of the rectifying column; allowing them to ascend in the column and exchange their oxygen for descending nitrogen so that the oxygen descends in a liquid state while the nitrogen vapors ascend and a part of the nitrogen vapors is liquefied by the condenser at the top of the rectifying column and conducted back into the top of the rectifying column, while another part of the said nitrogen vapors is conducted from the top of the evaporating column through the condenser of the dephlegmation column liquefied in the same and caused to flow, in a liquid state into the top of the dephlegmation column; conducting the nitrogen vapors that ascend from the dephlegmation column to the exterior of this column and through a heat exchanger; tapping off a part of the last named nitrogen vapors from the heat exchanger at a point beyond the coldest point in the circulation system; superheating them; and then expanding the said tapped off vapors under performance of useful work; compressing up to a considerable pressure the part of nitrogen vapors that is not tapped off and conducting them first through a heat exchanger, then through the evaporator of the dephlegmation column for the purpose of heating it, then through the evaporator of the evaporating column for the purpose of heating it, then through an expanding device by which it is caused to expand to sufficiently low pressure and into a condenser above the evaporating column, while the vapors formed in the evaporator of the evaporating column are conducted by a cooling pipe through a condenser located above the evaporating column and the liquid thus formed is allowed to flow into the dephlegmation column; allowing the liquid oxygen which collects in the evaporator of the dephlegmation column to pass into the condenser situated above the dephlegmation column and allowing it to expand in the said condenser so that its pressure drops from the pressure existing in the rectifying column to almost atmospheric pressure, and in conducting the vapors formed in the said condenser to be placed where they are required.

3. Process for liquefying and separating oxygen and nitrogen gases by means of a rectifying column provided with a dephlegmation column, an evaporating column, an evaporator beneath the evaporating column and a condenser above the dephlegmation column, said process consisting in compressing the gases up to any desired pressure, conducting them in a gaseous state through a heat exchanger into the dephlegmation column connected to the evaporating column of the rectifying column; allowing them to ascend in the column and exchange their oxygen for descending nitrogen so that the oxygen descends in a liquid state while the nitrogen vapors ascend and a part of the nitrogen vapors is liquefied by the condenser at the top of the rectifying column and conducted back into the top of the rectifying column, while another part of the said nitrogen vapors is conducted from the top of the evaporating column to the condenser, liquefied in the same and caused to flow in a liquid state into the top of the dephlegmation column; conducting the nitrogen vapors that ascend from the dephlegmation column to the exterior of this column and through a heat exchanger; tapping off a part of the last named nitrogen vapors from the heat exchanger at a point beyond the coldest point in the circulation system; superheating them; and then expanding the said tapped off vapors under performance of useful work; compressing up to a considerable pressure the part of nitrogen vapors that is not tapped off and conducting them first through a heat exchanger, then through the evaporator of the dephlegmation column for the purpose of heating it, then through the evaporator of the evaporating column for the purpose of heating it then through an expanding device by which it is caused to expand to a sufficiently low pressure and into a condenser above the evaporating column, while the vapors formed in the evaporator of the evaporating column are conducted by a cooling pipe through a condenser located above the evaporating column and the liquid thus formed is allowed to flow into the dephlegmation column; allowing the liquid oxygen which collects in the evaporator of the dephlegmation column to pass into the condenser situated above the dephlegmation column and allowing it to expand in the said condenser so that its pressure drops from the pressure existing in the rectifying column to almost atmospheric pressure, and in conducting the vapors formed in the said condenser into the combustion gases of a furnace so that the oxygen thus added to the air of combustion produces a high temperature of combustion and a corresponding high temperature of the waste gases of the furnace; causing these waste gases to heat the nitrogen gases that are tapped off from the heat exchanger, whereby the work they perform when they expand is increased, and utilizing this increase of work for producing the oxygen added to the said combustion gases.

4. Process for liquefying and separating oxygen and nitrogen gases by means of a rectifying column provided with a dephlegmation column, an evaporating column, an evaporator beneath the evaporating column and a condenser above the dephlegmation column, said process consisting in compressing the gases up to any desired pressure, conducting them in a gaseous state through a heat exchanger into the dephlegmation column connected to the evaporating column of the rectifying column; allowing them to ascend in the column and exchange their oxygen for descending nitrogen so that the oxygen descends in a liquid state while the nitrogen vapors ascend and a part of the nitrogen vapors is liquefied by the condenser at the top of the rectifying column and conducted back into the top of the rectifying column, while another part of the said nitrogen vapors is conducted from the top of the evaporating column through the condenser of the dephlegmation column, liquefied in the same and caused to flow in a liquid state into the top of the dephlegmation column; conducting the nitrogen vapors that ascend from the dephlegmation column to the exterior of this column and through a heat exchanger; tapping off a part of the last named nitrogen vapors from the heat exchanger at a point beyond the coldest point in the circulation system and then expanding the said tapped off vapors under performance of useful work; compressing up to a considerable pressure the part of nitrogen vapors that is not tapped off and conducting them first through a heat exchanger, then through the evaporator of the dephlegmation column for the purpose of heating it, then through the evaporator of the evaporating column for the purpose of heating it then through an expanding device by which it is caused to expand to a sufficiently low pressure and into a condenser above the evaporating column, while the vapors formed in the evaporator of the evaporating column are conducted by a cooling pipe through a condenser located above the evaporating column and the liquid thus formed is allowed to flow into the dephlegmation column; the said compression of the part of the nitrogen vapors from the top of the dephlegmation column that is not tapped off taking place when the operation of the plant is started, and the high compression compressor drawing the nitrogen from the condenser above the evaporating column instead of from the dephlegmation column when the said operation has commenced, allowing the liquid oxygen which collects in the evaporator of the dephlegmation column to pass into the condenser situated above the dephlegmation column and allowing it to expand in the said condenser so that its pressure drops from the pressure existing in the rectifying column to almost atmospheric pressure, and in conducting the vapors formed in the said condenser to the place where they are required.

In testimony whereof we have signed this specification in the presence of two witnesses.

RUDOLF FERDINAND MEWES.
RUDOLF KARL EDUARD MEWES.
Witnesses:
   EDWIN C. KURSCHEWITZ,
   E. HOLTERMAN.